July 13, 1948.  A. W. FERGUSON  2,445,109
COIL WINDER
Filed Dec. 14, 1946  5 Sheets-Sheet 4
Fig.4
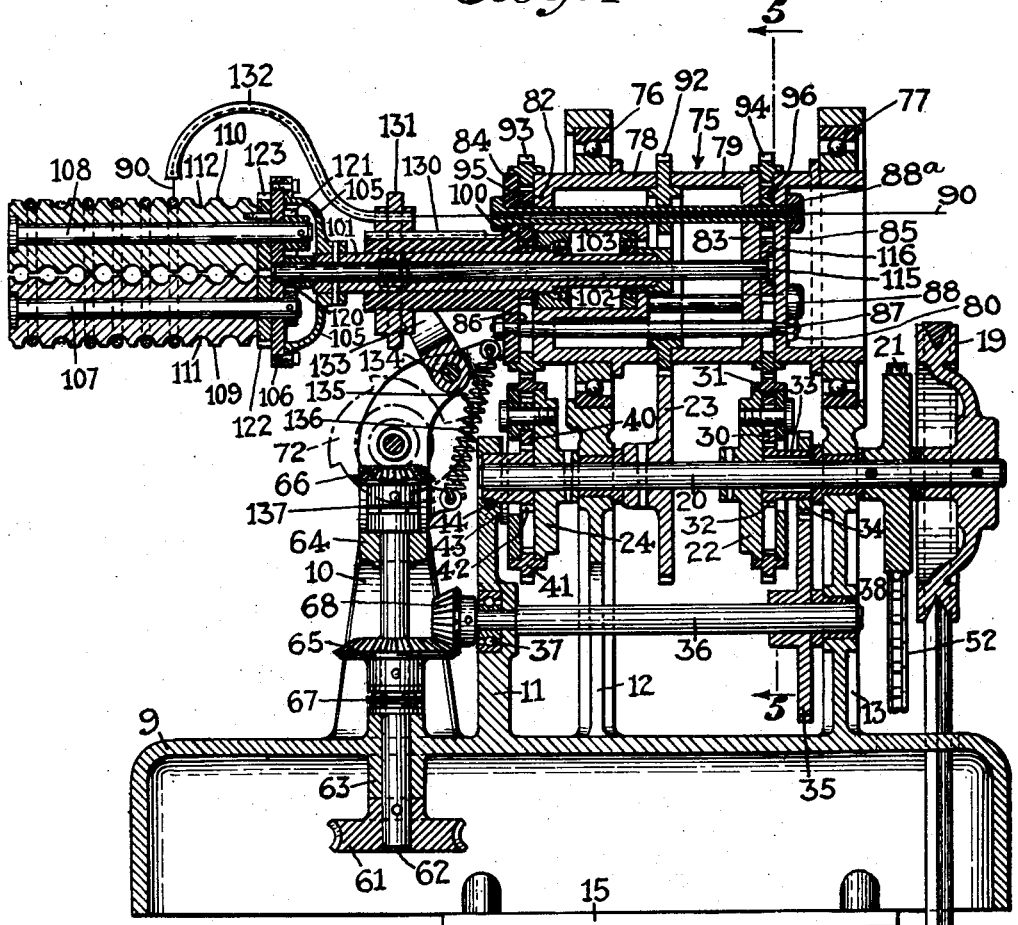
Fig.8
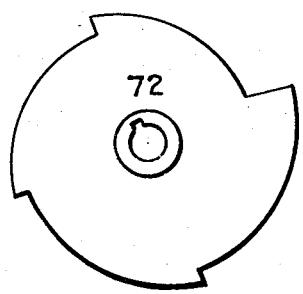
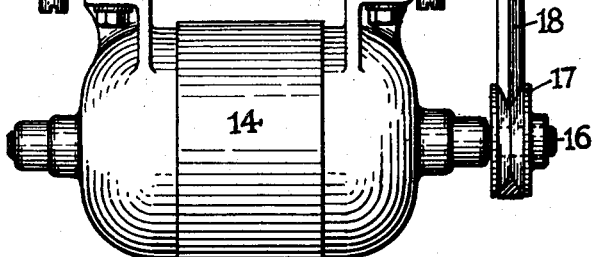
INVENTOR
ANDREW W. FERGUSON
ATTORNEY July 13, 1948.     A. W. FERGUSON     2,445,109
COIL WINDER
Filed Dec. 14, 1946     5 Sheets-Sheet 5
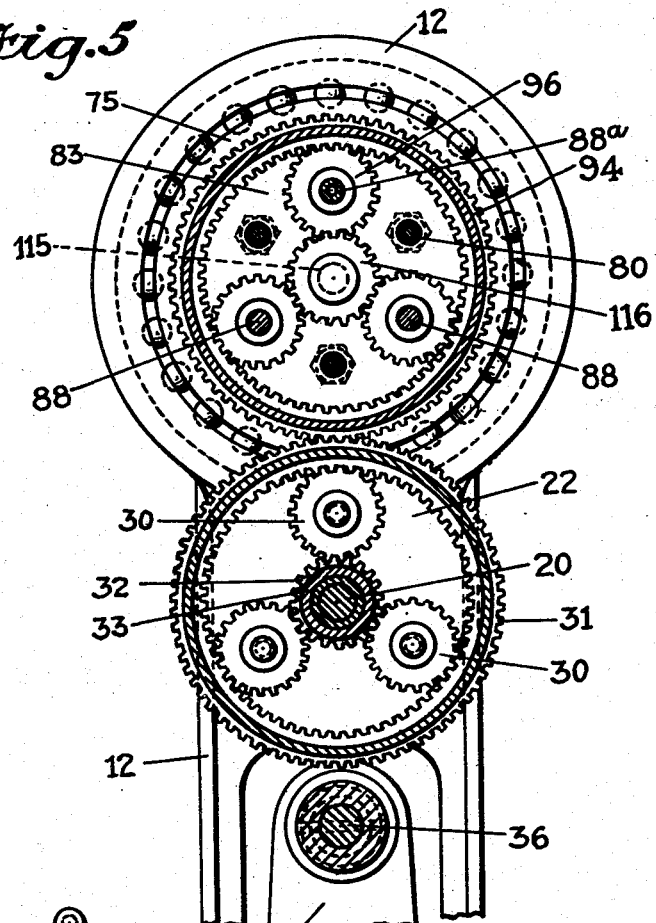
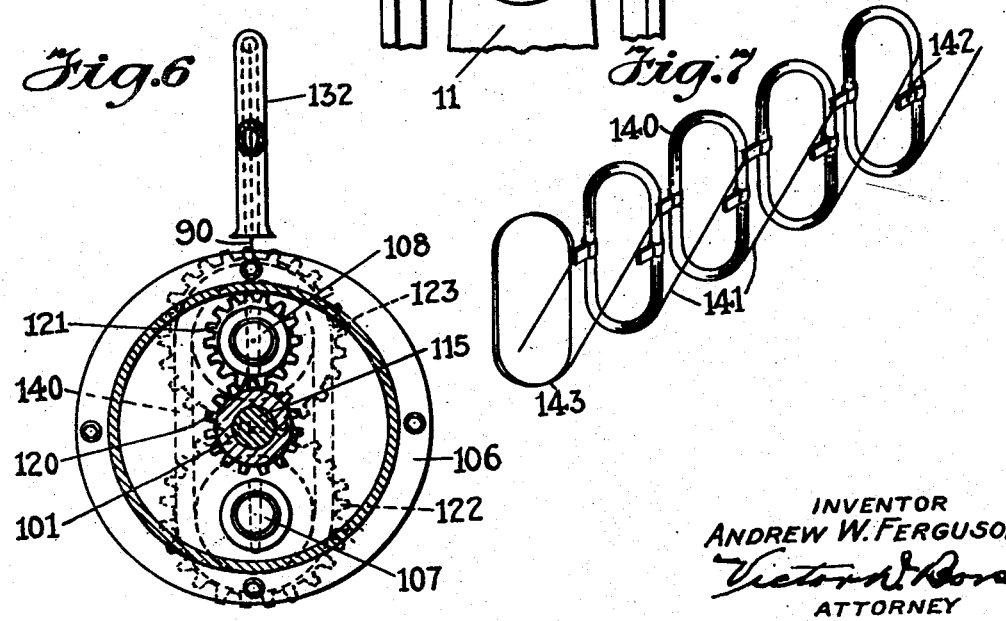
INVENTOR
ANDREW W. FERGUSON
ATTORNEY Patented July 13, 1948

2,445,109

UNITED STATES PATENT OFFICE 2,445,109

COIL WINDER

Andrew W. Ferguson, Great Neck, N. Y., assignor to Ford Instrument Company, Inc., Long Island City, N. Y., a corporation of New York Application December 14, 1946, Serial No. 716,262

8 Claims. (Cl. 140—92.2)

This invention relates to coil winding machines and more particularly to a machine for winding distributed field or armature coils for electric motors and generators or the like.

An object of the invention is to provide a machine of the above type which is adapted to wind coils in a plurality of connected sections, the number of sections in each group and the number of turns per section being controlled by a simple adjustment of the machine.

Another object is to provide a machine for the above purpose providing for a continuous flow and removal of completed coils without interruption to the winding of other coils.

Various other objects and advantages will be apparent as the nature of the invention is more fully disclosed.

In accordance with the present invention the coil sections are wound on a pair of spirally grooved spindles which are rotatable to feed the sections axially of the spindles. A wire guide is mounted to be rotated around the spindles for winding the coils. Cam means are provided for advancing the wire guide axially with the feed of the helical grooves while each section is being wound and then to retract the wire guide to a new groove position for winding each following section. The various elements are gear driven and are arranged so that the number of turns in the various sections and the number of connected sections in each group may be adjusted by replacing certain interchangeable gears and linkages.

Although the novel features which are believed to be characteristic of this invention are pointed out more particularly in the claims appended hereto, the nature of the invention will be better understood by referring to the following description, taken in connection with the accompanying drawings forming a part thereof in which a specific embodiment has been set forth for purposes of illustration.

In the drawings:

Fig. 4 is a vertical section taken along the line 4—4 of Fig. 2;

Fig. 5 is a vertical section taken along the line 5—5 of Fig. 4;

Fig. 6 is a vertical section taken along the line 6—6 of Fig. 1 showing the driving gears;

Fig. 7 is a detail view of a set of coil sections as wound on the present machine; and Fig. 8 is a detail view of one form of cam for controlling the advance of the wire guide.

Figure 1:
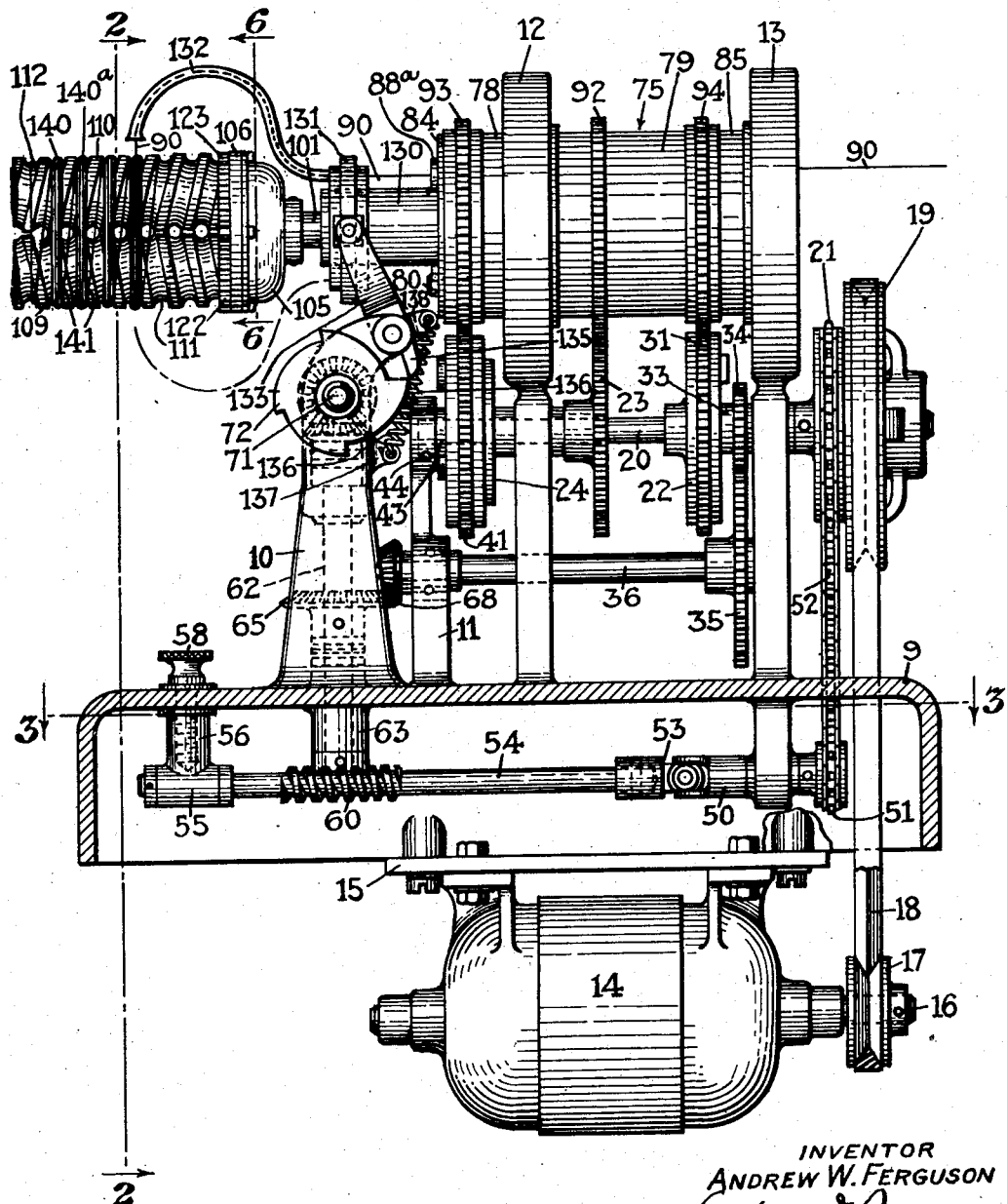
Fig. 1 is a vertical section taken along the line 1—1 of Fig. 2 showing the winding mechanism and supports in side elevation.

Referring to the drawings more in detail, the machine is shown as comprising a frame having a hollow base 9 and pedestal brackets 10, 11, 12 and 13 extending upwardly therefrom. A driving motor 14 is mounted on bracket 15 beneath the hollow base 9. The driving motor 14 includes a shaft 16 carrying a driving pulley 17 driving a belt 18.

The belt 18 drives a pulley 19 which is mounted on a horizontal shaft 20 journalled in the brackets 12 and 13. The shaft 20 carries a sprocket 21, a planet gear spider 22, a driving gear 23 and a planet gear spider 24.

The planet gear spider 22 carries planet gears 30 meshing with a ring gear 31 which turns about the spider 22, and a sun gear 32 which is mounted on a sleeve 33 which turns about the shaft 20. The sleeve 33 carries a driven gear 34 meshing with a driving gear 35 which is mounted on a shaft 36 journalled in bearings 37 and 38 in brackets 11 and 13 respectively.

The planet gear spider 24 carries planet gears 40 meshing with a ring gear 41 which turns about the spider 24, and with a sun gear 42 which is mounted on a sleeve 43 which extends around the shaft 20, but is prevented from rotating by a pin 44 in the bracket 11.

Figure 3:
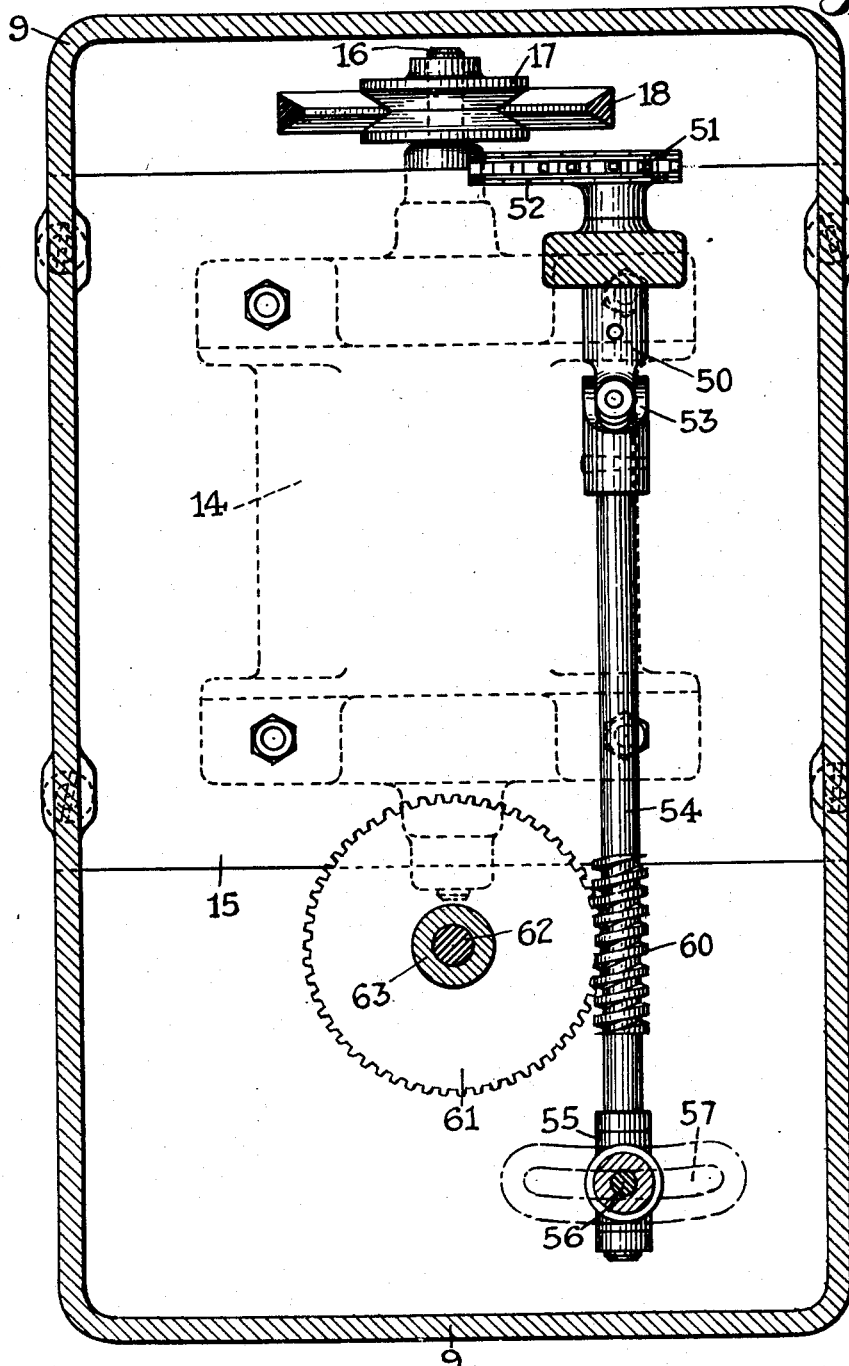
Fig. 3 is a horizontal section taken along the line 3—3 of Figs. 1 and 2.

A shaft 50 is journalled in an extension of the bracket 13 within the hollow base 9 and carries a sprocket 51 which is driven from the sprocket 21 by a chain 52. The shaft 50 is connected by a universal coupling 53 to a shaft 54 which is journalled in a bracket 55. The bracket 55 is adjustably mounted by means of a stud 56 extending through an arcuate slot 57 (Fig. 3) in the top of the hollow base 9 and clamped in adjusted position by a clamp screw 58.

The shaft 54 carries a worm 60 (Fig. 3) meshing with a worm gear 61 carried on a vertical shaft 62 which is journalled in a boss 63 forming a part of the base 9 and in a bearing 64 (Fig. 4) in the pedestal bracket 10. The shaft 62 carries beveled gears 65 and 66 and is supported on a vertical thrust bearing 67. The beveled gear 65 meshes with the beveled gear 68 mounted on the shaft 36 and serves to drive the latter shaft.

Figure 2:
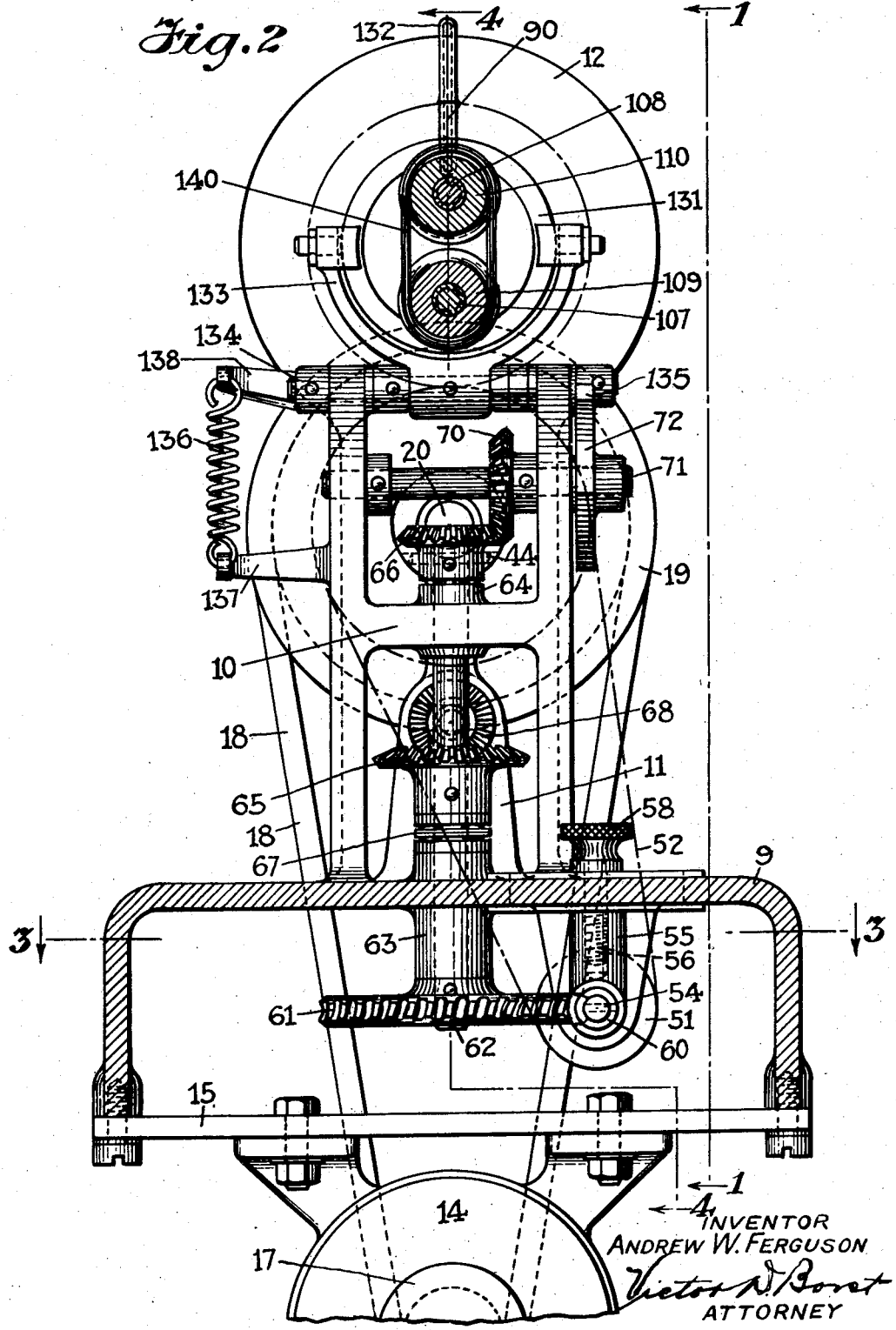
Fig. 2 is a transverse vertical section taken along the line 2—2 of Fig. 1 showing the frame and driving gears in end elevation.

The beveled gear 66 drives a beveled gear 70 (Fig. 2) mounted on a cam shaft 71 which is journalled in the pedestal bracket 10 and carries a cam 72 to be described.

A barrel 75 (Figs. 1, 4 and 5) is rotatably mounted in bearings 76 and 77 carried in brackets 12 and 13 respectively. The barrel 75 comprises a pair of central cup-shaped sections 78 and 79 secured together by clamping bolts 80, and having ends 82 and 83, end plate 84 and an open cup-shaped end piece 85. The end pieces 84 and 85 are spaced from the ends 82 and 83 respectively by shoulders 86 and 87 on bolts 80.

A ring gear 92 meshing with the gear 23 is clamped between the barrel elements 78 and 79 and serves to drive the barrel in its bearings 76 and 77. Ring gears 93 and 94 are journalled to rotate about the barrel 75. The ring gear 93 is positioned between the end 82 and plate 84 and the ring gear 94 is positioned between the end 83 and the end piece 85. Two sets of planet gears 95 and 96, mounted respectively between the end plates 82 and 84 and the end plates 83 and 85, are carried on rods 88 extending through said ends 82 and 83. One of the rods (88a, Fig. 4) is hollow to receive a wire 90 for winding. The planet gears 95 and 96 mesh respectively with the ring gears 93 and 94.

The planet gears 95 also mesh with a sun gear 100 attached to a housing 101 which is journalled in bearings 102 in a housing 103 formed as a part of the section 78 of the barrel 75. The housing 101 extends beyond the barrel 75 and carries an end plate 105 to which a bearing plate 106 is secured. Shafts 107 and 108 are journalled in the bearing plate 106 and carry spindles 109 and 110 respectively, having helical grooves 111 and 112 of opposite pitch formed in the surfaces thereof.

A shaft 115 is journalled within the housing 101 and extends through the end 83 and the end plates 82 and 84 of the barrel. The shaft 115 carries a sun gear 116 which meshes with the planet gears 96 above described and is driven thereby.

The shaft 115 carries a gear 120 (Figs. 4 and 6) which meshes with a gear 121 attached to the shaft 108 for driving the same. The shafts 107 and 108 carry gears 122 and 123 respectively which cause the two shafts to rotate at the same speed but in opposite directions.

A sleeve 130 is journalled around the housing 101 and is attached to the end plate 84 of the barrel 75. A collar 131 is keyed to the outside of the sleeve 130 to rotate therewith, but to be relatively movable axially thereof. The collar 131 carries a hollow wire guide 132 through which the wire 90 is fed to the grooves 111 and 112 of the spindles 109 and 110 as the wire guide rotates around the spindles.

The collar 131 is actuated by a yoke 133 which is mounted on a shaft 134 (Fig. 2) journalled in the bracket 10. The shaft 134 carries a cam follower 135 which is adapted to engage the surface of the cam 72 and is held against the cam by a spring 136 extending between an arm 137 carried by the bracket 10 and an arm 138 which is attached to the shaft 134.

In the operation of this device the shaft 115 and the spindles 109 and 110 are driven from the shaft 20 through two planetary gear trains including sun gear 32, planet gears 30, ring gear 31, ring gear 94, planet gears 96 and sun gear 116. The planet gear spider 22 is driven with the shaft 20 and the sun gear 32 is driven through gears 34 and 35 from the shaft 36. The planet gears 96 being mounted on the barrel 75 are rotated therewith by the gears 92 and 23 from the shaft 20. The shaft 115 is accordingly driven at a speed which is dependent upon the various gear ratios in the two planet gear trains. This drive is at a comparatively low speed so that the helical grooves 111 and 112 in the spindles 109 and 110 feed slowly along the spindles toward the free ends thereof (toward the left as seen in Fig. 4).

The wire guide 132 which turns with the sleeve 130 rotates with the barrel 75 to which the sleeve 130 is attached. The barrel 75 is driven from the shaft 20 by gears 23 and 92.

The housing 101 and sun gear 100 are connected to the sun gear 42 through a double planetary gear train which includes sun gear 42, planet gears 40, ring gear 41, ring gear 93, planet gears 95 and sun gear 100. The planet gears 40 and 95 rotate respectively with the spider 24 and the barrel 75. The spider 24 rotates with the shaft 20 and the barrel 75 is driven in a one to one ratio with the shaft 20 by the gears 23 and 92. Hence the two sets of planet gears rotate at the same speed. The gear ratios of the two planetary gear trains are made identical and since the sun gear 42 is rigidly secured by the pin 44 and remains fixed, the sun gear 100 will likewise remain fixed and will hold the housing 101 and the spindles 109 and 110 against rotation about the axis of the shaft 115.

The cam 72 is driven by shafts 71, 62, 54 and 50, sprocket 51, chain 52, sprocket 21 and shaft 20. The speed of rotation of the cam is selected so that the various cam surfaces cause the collar 131 and the wire guide 132 to advance progressively to the left (as shown in Figs. 1 and 4) at a rate such that the wire guide follows the feed of the inclined helical grooves 111 and 112. This feed of the wire guide to the left with the slots 111 and 112 continues until the wire guide has rotated about the spindles 109 and 110 the required number of times to lay the selected number of turns of wire in the helical grooves 111 and 112 to form a coil section 140. The cam is designed so that at this point the wire guide is retracted to the right to a position to register with the next helical groove position and thereafter to feed along with the next groove until the correct number of turns has been laid therein to form another and similar coil section 140. The cam may be designed as shown in Fig. 8 so that each successive section is completed at an increased distance from the driven ends of the spindles 109 and 110. After the last section of the group has been built up as above described, the cam 72 allows the spring 136 to retract the wire guide 132 to its original position, but at a rate such that while passing along the helical grooves, two or more turns of wire will be wound in the next pair of grooves to provide a suitable free length of wire between groups of coil sections to serve for connection purposes.

The number of sections and the number of turns to be wound in each section may be readily changed by varying the cam 72 and by varying the gear ratio of the driving connection to the cam. A simple variation involves a substitution of the worm gear 61 with a worm gear of a different size. The universal connection 53 of the shaft 54 permits the shaft 54 to be swung inwardly or outwardly so that the worm 60 will register with various sizes of worm gears 61. The shaft 54 is locked in the correct position by the clamp screw 58 above described.

As the coil sections 140 are fed from the free ends of the spindles 109 and 110, they may be tied or clipped with clips 142 (Fig. 7) either manually or automatically as shown in my copending application, Serial No. 741,635, filed April 15, 1947, and may be removed in units as indicated in Fig. 7 wherein the various sections 140 are connected by connecting wires 141 and the plurality of loops 143 at the ends of the first and last sections provides connecting leads. The groups of sections 140 may be separated by severing the wire of the loops 143. The sections may then be flexed as desired and inserted in the field or armature slots of the electric motor or generator in the usual manner.

In the embodiment shown the spindles 109 and 110 are oppositely pitched and are rotated in opposite directions. They may however be pitched and rotated in the same direction if desired.

Although a specific embodiment of the invention has been shown for purposes of illustration, it is to be understood that various changes and modifications may be made therein and that the invention may be applied to various uses as will be readily apparent to a person skilled in the art. The invention is only to be restricted in accordance with the scope of the following claims.

What is claimed is:

1. A coil winding machine comprising a pair of spindles mounted for rotation about parallel axes, helical grooves in the surfaces of the respective spindles, means rotating said spindles at the same speed to cause said grooves to feed in the same axial direction, a wire guide rotatable about said spindles to wind turns of wire around the spindles and in the diametrically opposed positions of said grooves, means advancing said wire guide axially with the axial feed of said grooves, and means operable after a coil section of a predetermined number of turns has been built up to retract said wire guide to another groove position for winding a second coil section therein, said grooves being arranged to advance said coil sections axially and to progressively discharge the wound sections from the ends of said spindles.

2. A coil winding machine comprising a pair of spindles mounted for rotation about parallel axes, a stationary housing carrying said spindles, helical grooves in the surfaces of the respective spindles, a shaft journalled in said housing and connected to rotate said spindles at the same speed to feed said grooves axially, a rotating sleeve carried on said housing, a wire guide carried by said rotating sleeve to rotate about said spindles and positioned to wind turns of wire around the spindles and in the diametrically opposed portions of said grooves, means advancing the rotating wire guide axially with said feed of said grooves, and means retracting said wire guide to a new groove position after a coil section of a predetermined number of turns has been built up.

3. A coil winding machine comprising a pair of spindles mounted for rotation about parallel axes, a stationary housing carrying said spindles, helical grooves in the surfaces of the respective spindles, a shaft journalled in said housing and connected to rotate said spindles at the same speed to feed said grooves axially, a rotating sleeve carried on said housing, a wire guide carried by said rotating sleeve to rotate about said spindles and positioned to wind turns of wire around the spindles and in the diametrically opposed portions of said grooves, means advancing the rotating wire guide axially with said feed of said grooves, means retracting said wire guide to a new groove position after a coil section of a predetermined number of turns has been built up, bearings mounting said rotating sleeve, and bearing means for said housing and for said shaft positioned within said rotating sleeve.

4. A coil winding machine comprising a pair of spindles mounted for rotation about parallel axes, a stationary housing carrying said spindles, helical grooves in the surfaces of the respective spindles, a shaft journalled in said housing and connected to rotate said spindles at the same speed to feed said grooves axially, a rotating sleeve carried on said housing, a wire guide carried by said rotating sleeve to rotate about said spindles and positioned to wind turns of wire around the spindles and in the diametrically opposed portions of said grooves, means advancing the rotating wire guide axially with said feed of said grooves, means retracting said wire guide to a new groove position after a coil section of a predetermined number of turns has been built up, bearings mounting said rotating sleeve, bearing means for said housing and for said shaft positioned within said rotating sleeve, and a wire guide within said rotating sleeve to feed wire axially through said rotating sleeve to said first wire guide.

5. A coil winding machine comprising a drum, external bearings rotatably supporting said drum, means including an external gear driving said drum, first and second planetary gear trains in said drum, each including planet gears rotating with said drum, a ring gear rotating on said drum and a sun gear mounted axially of said drum, a housing attached to the first sun gear and projecting axially from said drum, a pair of spindles rotatably carried by said housing and having helical grooves, a shaft extending through said housing and attached to the second sun gear, means connecting said shaft to drive said spindles at the same speed to feed said grooves axially, a wire guide connected to rotate with said drum and positioned to wind turns of wire around said spindles, means advancing said wire guide with the feed of said grooves, and means driving said planetary gear trains for holding said housing against rotation and for driving said drum and said shaft.

6. A coil winding machine comprising a drum, external bearing rotatably supporting said drum, means including an external gear driving said drum, first and second planetary gear trains in said drum, each including planet gears rotating with said drums, a ring gear rotating on said drum and a sun gear mounted axially of said drum, a housing attached to the first sun gear and projecting axially from said drum, a pair of spindles rotatably carried by said housing and having helical grooves, a shaft extending through said housing and attached to the second sun gear, means connecting said shaft to drive said spindles at the same speed to feed said grooves axially, a wire guide connected to rotate with said drum and positioned to wind turns of wire around said spindles, means advancing said wire guide with the feed of said grooves, means driving said planetary gear trains for holding said housing against rotation and for driving said drum and said shaft, and means retracting said wire guide to a new groove position after a predetermined number of turns have been wound in the first groove position.

7. A coil winding machine comprising a drum, external bearings rotatably supporting said drum, means including an external gear driving said drum, first and second planetary gear trains in said drum, each including planet gears rotating with said drum, a ring gear rotating on said drum and a sun gear mounted axially of said drum, a housing attached to the first sun gear and projecting axially from said drum, a pair of spindles rotatably carried by said housing and having helical grooves, a shaft extending through said housing and attached to the second sun gear, means connecting said shaft to drive said spindles at the same speed to feed said grooves axially, a wire guide connected to rotate with said drum and positioned to wind turns of wire around said spindles, means feeding wire through said drum to said wire guide, third and fourth planetary gear trains having ring gears connected respectively to drive said first and second ring gears and having respective sun gears and planet gears, means driving said third and fourth planetary gear trains, said first and third planetary gear trains having gear ratios adapted to maintain the first sun gear and said housing stationary, and means advancing said wire guide axially with the feed of said grooves to wind a predetermined number of turns in a selected groove position.

8. A coil winding machine comprising a drum, external bearings rotatably supporting said drum, means including an external gear driving said drum, first and second planetary gear trains in said drum, each including planet gears rotating with said drum, a ring gear rotating on said drum and a sun gear mounted axially of said drum, a housing attached to the first sun gear and projecting axially from said drum, a pair of spindles rotatably carried by said housing and having helical grooves, a shaft extending through said housing and attached to the second sun gear, means connecting said shaft to drive said spindles at the same speed to feed said grooves axially, a wire guide connected to rotate with said drum and positioned to wind turns of wire around said spindles, means feeding wire through said drum to said wire guide, third and fourth planetary gear trains having ring gears connected respectively to drive said first and second ring gears and having respective sun gears and planet gears, means driving said third and fourth planetary gear trains, said first and third planetary gear trains having gear ratios adapted to maintain the first sun gear and said housing stationary, cam means driven in synchronism with said fourth planetary gear train and adapted to advance said wire guide with the feed of said grooves, and means including said cam means to retract said wire guide to a new groove position after a coil section of a predetermined number of turns has been built up in the first groove position so that successive coil sections are built up and fed axially of said spindles, said grooves being arranged to successively discharge the wound sections from said spindles.

ANDREW W. FERGUSON.

REFERENCES CITED

The following references are of record in the file of this patent:

UNITED STATES PATENTS

| Number | Name | Date |
| --- | --- | --- |
| 2,187,267 | Galligan | Jan. 16, 1940 |
| 2,233,982 | Kelley | Mar. 4, 1941 |